Patented June 1, 1937

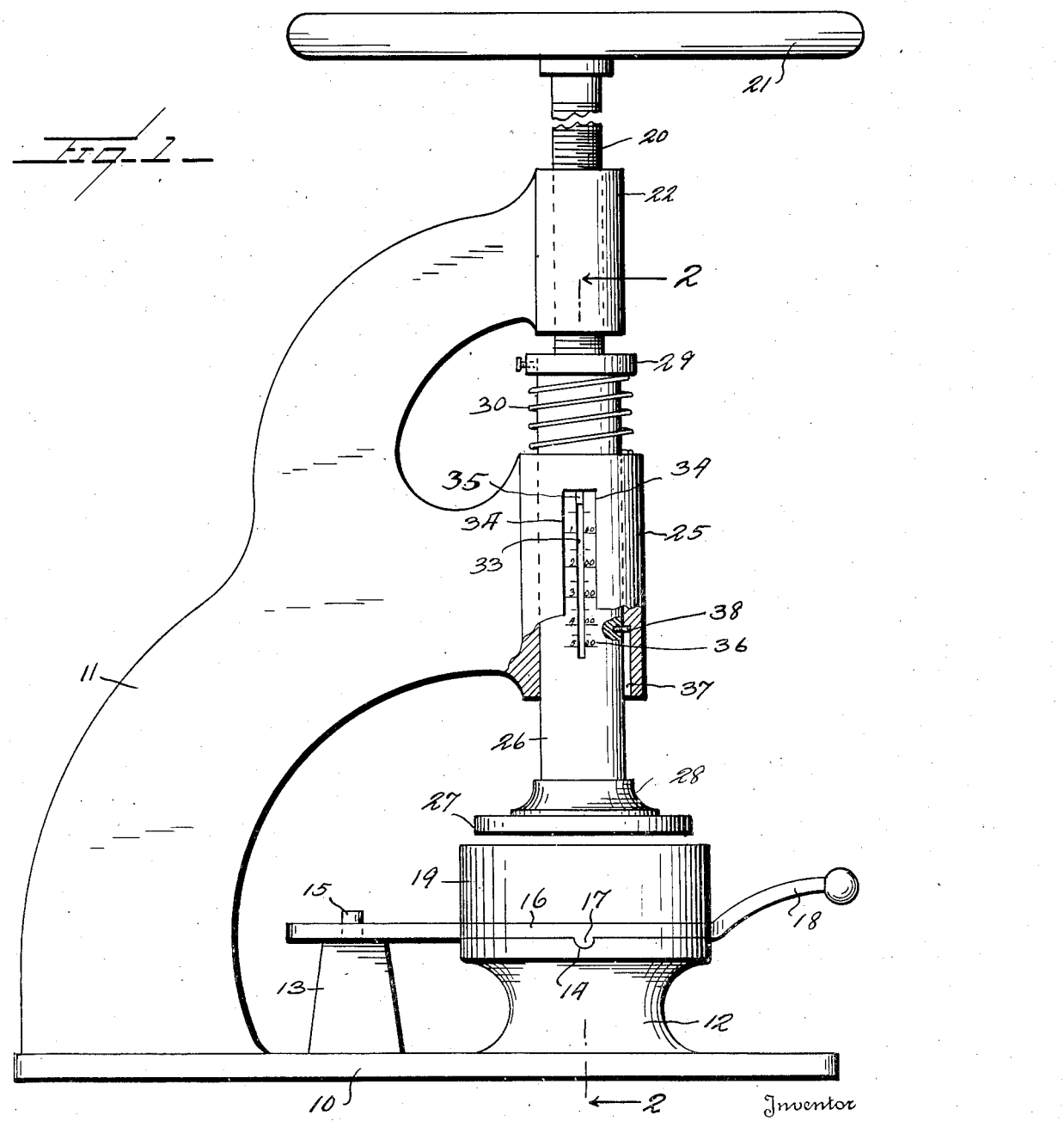

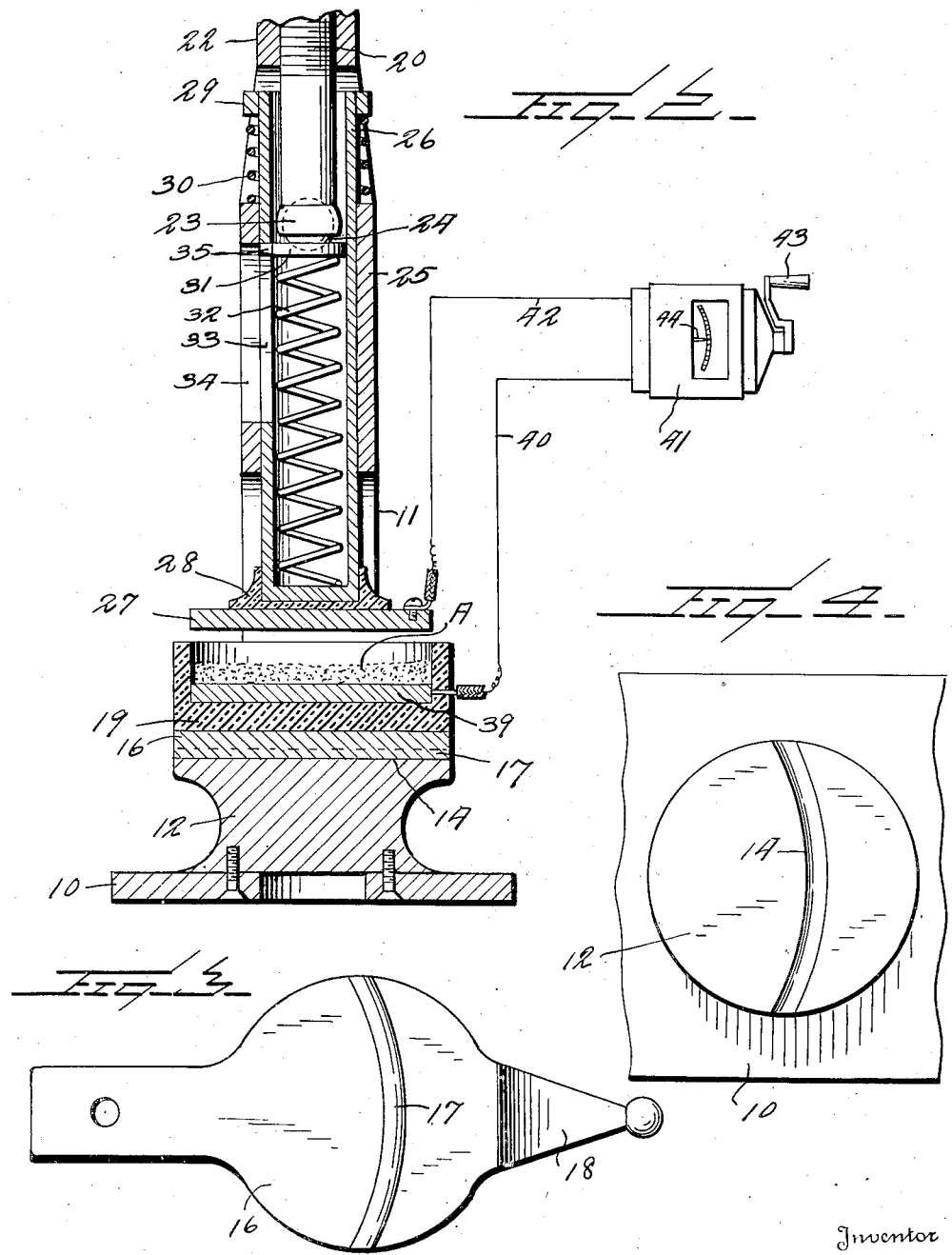

2,082,364

UNITED STATES PATENT OFFICE 2,082,364

MOISTURE TESTER

Arthur O. Storé, Regina, Saskatchewan, Canada

Application December 19, 1933, Serial No. 703,113

13 Claims. (Cl. 175—183)

This invention relates to devices for testing the moisture content of various materials and particularly to a tester of this kind in which the article to be tested is subjected to a predetermined pressure while an electric current is passing through the article being tested to an ohmmeter or other electrical measuring instrument.

The general object of the invention is to provide a tester of the character described which is of practically universal application, which may be used for testing the moisture content of the breath, used in the diagnosis of respiratory diseases, and which also may be used for testing practically all organic substances for the water content, such substances, for instance, as cereal grains, seeds, tea, coffee, flour, sugar, comminuted wood, fruits, etc.

A further object is to provide a structure of this character having therein a cup wherein the material to be tested is to be disposed, the cup having a predetermined area and there being a plunger capable of being forced into the cup with a predetermined pressure for the purpose of compressing the material in the cup and eliminating, as far as possible, all interstitial spaces between the particles of the material being tested.

A further object is to provide a testing device of this character whereby to secure a known pressure on a mass of material having a predetermined thickness over an area of given dimensions while a current of predetermined voltage is being passed through the mass to an ohmmeter preferably such as will indicate the percentage of moisture in the mass.

Other objects will appear in the course of the following description.

My invention is illustrated in the accompanying drawings, wherein:—

Figure 1 is a side elevation of a moisture testing instrument constructed in accordance with my invention;

Figure 2 is a vertical section on the line 2—2 of Figure 1;

Figure 3 is an under side view of the swinging plate supporting the cup;

Figure 4 is a top plan view of the base plate upon which the plate shown in Figure 3 normally rests.

Referring to these drawings, 10 designates a base of any suitable construction and 11 a bracket or standard extending upward from the base. Upon the base 10 there is mounted a support 12 and extending up adjacent to this support 12 is a support 13. The upper face of the support 12 as shown in Figure 4 is preferably formed with an arcuate groove 14 and mounted upon a pin 15 extending upward from the support 13 is one end of a plate 16 which is adapted to fit over and rest on top of the support 12, this plate being formed on its under face with an arcuate rib 17 adapted to fit within the arcuate groove 14. The member 16 is provided with the handle 18 whereby it may be swung upon the pivot 15 into or out of registry with the upper end of the support 12. This support 12 constitutes a base for the support of a cup 19 of insulating material which is detachably mounted upon the upper face of the plate 16 so that the cup may be removed from this plate for cleaning.

As illustrated, the base 12 or support is detachably mounted upon the base plate 10 as shown in Figure 2. The cup 19 is illustrated as being circular in plan and having an upstanding side wall but I do not wish to be limited to this as the cup might be square or many-sided in plan view or have any other desired shape in plan view without departing in any way from the spirit of my invention.

The upper end of the bracket or standard 11 is formed with a screw-threaded bearing for a screw 20 having a handle 21. This screw extends downward beyond the bearing 22 and, as shown in Figure 2, is provided with a head 23 which is hollow to support within it the antifriction ball 24. Below the bearing 22 is a second bearing sleeve 25 and disposed within this sleeve and movable downwardly therein is the tubular section 26 of the plunger. This section 26 is open at its upper end and shown as closed at its lower end and provided with a plunger head 27 of conductive material insulated from the section 26, however, by insulation 28. The sleeve-like section 26 is formed at its upper end with a stop collar 29 and disposed between the upper end of the bearing 25 and this collar is a compression spring 30. Operating within the tubular section 26 of the plunger is a disk 31 and between this disk and the closed end of the section 26, there is disposed a compression spring 32.

The section 26 is slotted at 33 and the bearing 25 has a wider slot 34 coinciding with the slot 33. The disk 31 is provided with an outwardly extending pointer 35 which projects out through the slot 33 and moves over a graduated scale 36 marked upon the plunger section 26. The bearing 25 is grooved at 37 and a pin or feather 38, which is removable, extends into this groove so as to permit or prevent any rotation of the section 26 as it moves up or down.

With this construction, it will be seen that as the screw 20 is turned, it will compress the springs 32 and 26, forcing the plunger head downward into the cup and that as the screw 20 is turned, more and more compressive force will be exerted upon the plunger head due to the compression of the spring 32 and the compression of the spring 26. The amount of pressure exerted upon the plunger head is indicated by the position of the pointer 35 with relation to the scale 36.

Disposed in the cup 19 adjacent to the bottom thereof is a metallic contact or pole piece 39 which will contact with the material A within the cup and this is connected to a wire 40 extending to an ohmmeter (preferably a current generating ohmmeter) designated 41. From the press head 27, a second wire 42 extends to the ohmmeter.

While I do not wish to be limited to the particular form of ohmmeter or the particular means of generating current, I preferably use an ohmmeter having in conjunction therewith a hand generator, the handle of the generator being designated 43 in Figure 2. This ohmmeter consists of a hand driven generator and a direct reading ohmmeter mounted together in a case, this ohmmeter being used particularly for the purpose of testing insulation. The ohmmeter forms no part of my present invention. This particular form of ohmmeter and generator is sold on the market under the name of "The Meg Insulation Tester."

In the operation of this mechanism, the material to be tested is ground to a greater or less degree of fineness depending upon the material and is placed within the cup 19. At this time, the supporting member 16 is swung outward away from a position beneath the plunger so as to permit the cup to be filled or partly filled to a predetermined height with material A. The cup is then swung back into position and the screw 20 turned compressing the spring 32 and thus forcing the plunger head 27 downward into the cup, compressing the predetermined thickness of material within the cup to a predetermined degree, depending upon the material, the amount of pressure being exerted on this plunger head being indicated by the pointer 35 moving over the graduations 36. When the material within the cup has been placed under the predetermined pressure, which is standard for all materials of the same kind, the handle 43 of the ohmmeter generator is rotated to cause a current of predetermined voltage to pass through the metallic pole piece or head 27 through the material and out through the contact 39 and back to the ohmmeter, the hand 44 of the ohmmeter registering the resistivity of the material and thus indicating the moisture content, it being understood that the greater the moisture content, the less resistance there is. Preferably, this ohmmeter will be provided with a scale indicating the percentage of moisture present instead of indicating resistance.

The particular manner of marking the dial of the ohmmeter and calibrating it forms no part of the present invention.

In using the moisture measuring device, a predetermined measured quantity of the material is to be used, the quantity of material depending upon the character of the material. The material is preferably ground to a predetermined degree of fineness. Thus all material of the same character ground to the same degree of fineness will fill the cup 19 to approximately the same level. By depressing the plunger and putting the ground material under a predetermined pressure, the pressure being predetermined for the particular character of material to be tested and the particular fineness to which said material has been ground or comminuted, the intersticial air spaces between the particles of the material are reduced as much as possible to secure a good passage of the electric current by eliminating the air spaces.

While I have illustrated a particular means for subjecting the mass to be tested to pressure, I do not wish to be limited to this particular means as other means might be used than the screw 20 as long as the resultant pressure is determinate, that is, capable of being determined and constant, that is, not a variable pressure but held at the required pressure, while current is being passed through the mass.

While preferably, the material to be tested will be ground (except cases which will be hereinafter stated), yet I do not wish to be limited to this as whole kernels of wheat, whole seeds and whole grains may be tested for moisture content but these will require increased pressures as compared to ground or comminuted grains in order to reduce, as far as possible, the air spaces between the grains.

It will be seen that there are four factors necessary for the purpose of determining the moisture content of any particular substance or material. For any one particular material, the voltage employed, the pressure on the material, the cross sectional area of the cup, and the depth of the material in the cup must all be predetermined. Of course, by weighing the comminuted material and using only a predetermined weight the depth of this material within the cup will be predetermined. A chart or scale is designed to be provided with each of these instruments, stating the various materials or substances whose moisture content may be measured by the instrument and this chart will state the proper voltage to be used for that particular material, the proper degree of comminution, the pressure to which it is to be subjected and the amount of material to be disposed within the cup and, therefore, the thickness of the material within the cup. The area of the cup is, of course, constant and while I do not wish to be limited thereto in any way, yet preferably this area is approximately 12 square inches as is the area of the plunger head 27. The voltage employed may vary from one volt to a thousand volts or more depending upon the material to be tested.

The graduations on the standard of the press may read from one hundred to five hundred or more and indicate pounds pressure applied by the upper pole plate or plunger head 27 to the mash formed of the substance to be tested. The substance to be tested is to be kept at a uniform pressure while being tested. This is essential because the resistance to the electric current passing through the mash or comminuted material will, of course, vary inversely with the pressure applied through the press.

It is reiterated that I do not wish to be limited to any particular form for the cup 19 or the plunger head 27 or to any particular dimensions. This head 27 and the cup may be diamond-shaped, round, oval, rectangular or triangular or any other form which might be suitable or convenient.

Not only may this device be used for testing the amount of moisture in ground material such as coffee, grain seeds, meals, paper stock, sawdust, shavings, etc., but it is also applicable in the practical diagnosis of respiratory afflictions and kindred medical uses and is admirably suited for determining the moisture content of respired breath or even the humidity of a room or of the atmosphere.

In measuring the moisture content of breath, any substance or tissue such as linen, absorbent cotton, or blotting paper, which material readily absorbs moisture, may be used, this material being first cut to the approximate shape and size of the pole plates, that is, the cup 19 and the plunger head 27 and this material is held before the mouth and nostrils of the person whose breath is tested. It is then placed within the cup and the press is screwed down until the desired pressure is registered and the moisture content will then be recorded in the usual way on the dial. In testing the humidity of a room, the absorbent substance will be exposed to atmosphere of the room and then placed between the pole plates, constituted by the parts 39 and 27, and tested in the manner heretofore stated.

It will be noted that my invention is of universal use whereas other inventions along this line known to me are without exception designed for testing only one substance or group of substances. My invention will test flour, sugar, cereals, butter, dried meats, dried fruits and vegetables, cheese, tea, coffee, nuts, wood shavings, spices, tobacco, fibres, leather, hair or any organic substances which are capable of being shredded, mashed or ground.

I am aware of the fact that rollers have been used in moisture testers, the substance to be tested passing between the rollers and pressure being exerted by the rollers but in testers of this form, the rollers will take up some of the moisture contained within the substance to be tested with the result that unless the rollers are carefully cleaned and dried between each test, the tests will not be accurate. In the roller type of tester, the surfaces coming in contact with the material are not readily accessible and are not readily cleaned.

Furthermore, the roller type tester cannot efficiently test the moisture content of a finely granulated or pulverized substance, such as flour, fine sugar or bran, because the substance being tested will slip through or adhere to the roller plates or may even have small interstices left within the substance due to the fact that there is no way under the roller type of tester whereby a constant pressure can be applied on the substance while it is being tested. My construction is such that the substance to be tested can be held at a uniform pressure at all times during the test, this pressure to be predetermined in accordance with the organic composition of the substance to be tested.

Furthermore, in the roller type of tester, the substance to be tested passes between the rollers while they are rotating. The pressure on the substance between the two portions of the rollers closest together, will inevitably be greater than the pressure on that portion of the substance which has just passed through the space where the two rollers are closest or greater than the pressure on that portion of the substance which has not yet entered this space. Therefore, there will be a very great inaccuracy in the resultant reading of a dial of an ohmmeter. This is entirely eliminated in my invention because pressure is exerted evenly upon all portions of the substance at all points of contact and such pressure is retained at a constant figure.

The importance of grinding, comminuting or otherwise reducing the material to small particles is of utmost importance as if, for instance, a grain is being tested in the kernel, the outer surface of the kernel will be drier than the inner portion of the kernel and will, therefore, offer more resistance to the electric current passing through the substance during the test. If grain, for instance, is tested in a finely ground state, the outer surface of each kernel will be ground into fine particles as will the inner portion of the kernel and the particles of the outer portion will be evenly distributed through the mass consisting of the inner portion with the result that a homogeneous mass will be obtained, offering equal resistance to the passage of the electric current throughout the mass. This is also particularly necessary in view of the fact that if grain is exposed for several days to hot, dry weather, the outer surface will become extremely hard and resistant to the passage of current while the inner substance remains comparatively moist and conductive of current. Thus grain in the kernel and so exposed and tested would in fact appear to have a lower moisture content than it really has, whereas if such grain is tested in a finely ground state, the test would result in an accurate ascertainment of the true moisture content.

My instrument will operate with accuracy and efficiency, not only throughout the normal ranges of the moisture content but to the utmost extremity of either dryness or moistness.

While I have illustrated certain specific constructions and a certain arrangement of parts, I do not wish to be limited thereto as obviously many changes might be made without departing from the spirit of the invention as defined in the appended claims.

I have heretofore referred to the plate 27 as a plunger head and to the member 19 as a cup. It will be seen that these elements 27 and 19 with the contact member 39 constitute pole pieces or contact plates between which the material to be tested is disposed and submitted to pressure and that the only purpose of the circumferential wall on the member 19 is to prevent the material from escaping from between these "pole pieces" while it is being subjected to a predetermined pressure.

I claim:—

1. A process of determining the moisture content of a substance including the step of compressing a predetermined amount of the substance under such a predetermined pressure as will substantially eliminate any intersticial spaces, and measuring the electrical resistivity of the substance when so compressed while maintaining the pressure constant.

2. A process of determining the moisture content of a substance including the step of compressing a mass of the substance, the mass having an initial predetermined area and thickness, carrying the compression of the substance to a predetermined degree, and measuring the electrical resistivity of the substance while maintaining said compression on the substance.

3. A process of determining the moisture content of a substance including the step of compressing a predetermined amount of the substance in a comminuted state to a predetermined degree, and measuring the electrical resistivity of the substance while maintaining the substance under said predetermined pressure.

4. The process of determining the moisture content of a substance including comminuting the substance to a predetermined degree of fineness, placing a predetermined amount of the substance upon a fixed pole piece, while preventing lateral flow of the substance from the pole piece, exerting a predetermined and constant pressure upon the substance, and maintaining the substance under the predetermined pressure while measuring the electrical resistivity of the substance.

5. A testing instrument of the character described, including a cup for receiving the substance to be tested, a plunger disposed above the cup and including a plunger head fitting the cup, the plunger head and the bottom of the cup being flat, a spring disposed above the plunger head, means for compressing the spring to a predetermined amount to thereby cause the plunger head to exert a predetermined pressure on the material being tested, and means for electrically connecting the plunger head and the material to be tested in an electrical circuit with a resistance measuring instrument.

6. A testing instrument of the character described including a base, a cup supported upon the base and having a flat bottom, a plunger disposed above the cup and having a flat plunger head fitting the cup, a spring associated with the plunger and bearing at one end thereagainst, and adjustable means for exerting pressure upon the opposite end of said spring.

7. A testing instrument of the character described including a base, a cup supported upon the base and having a flat bottom, a plunger disposed above the cup and having a flat plunger head fitting the cup, a spring associated with the plunger and bearing at one end thereagainst, adjustable means for exerting pressure upon the opposite end of said spring, and means for indicating the amount of pressure so exerted.

8. A tester of the character described, including a cup having a peripheral wall, a plunger, a plunger head fitting the cup, the face of the plunger head confronting the cup conforming in shape to the bottom of the cup and being parallel thereto, means for connecting the plunger head and the material in the cup in circuit with an electrical testing instrument, adjustable means for exerting variable pressures upon the plunger, and means for indicating said pressures so exerted.

9. A testing instrument of the character described comprising a cup adapted to receive the material to be tested, a plunger disposed above the cup and having a plunger head fitting the cup, a guide within which the plunger is mounted, a spring disposed above the plunger, an element resting upon the spring and having a pointer, the guide being slotted to permit the inspection of the pointer, and the guide having graduations coacting with the pointer, and adjustable means for exerting pressure upon said member to compress the spring to varying degrees and subject the material within the cup to a predetermined pressure.

10. A testing instrument of the character described comprising a cup adapted to receive the material to be tested, a plunger disposed above the cup and having a plunger head fitting the cup, a guide within which the plunger is mounted, a spring disposed above the plunger, an element resting upon the spring and having a pointer, the guide being slotted to permit the inspection of the pointer, and the guide having graduations coacting with the pointer, and a screw disposed to engage said member and force it downward to compress the spring and exert a predetermined pressure on the plunger head and the material within the cup.

11. A testing instrument of the character described, comprising a cup adapted to receive the material to be tested, a plunger disposed above the cup and having a plunger head fitting the cup, a guide within which the plunger is mounted, a spring disposed above the plunger, an element resting upon the spring and having a pointer, the guide being slotted to permit the inspection of the pointer, the guide having graduations coacting with the pointer, a screw disposed to engage said element and force it downward to compress the spring and exert a predetermined pressure on the plunger head and the material within the cup, and means for preventing rotation of the member with the screw.

12. A testing instrument of the character described comprising a base having a standard, and an upwardly extending support, a cup detachably mounted upon the support, a plunger mounted upon the standard in alinement with the cup, the standard having a guide through which the plunger passes, a plunger head mounted upon the lower end of the plunger but insulated therefrom, and having an area equal to that of the cup, the plunger being hollow, a compression spring disposed within the plunger, a member mounted upon the compression spring and having a pointer, the plunger and guide being slotted to permit observation of the pointer and the plunger having graduations adjacent the slot whereby the depression of the member may be noted, a spring urging the plunger upward, the spring being lighter than the first named spring, and a screw having threaded engagement with the standard entering the upper end of the plunger and bearing against said member whereby varying degrees of pressure may be applied to the plunger head and to the material within the cup, and means for connecting the material within the cup in circuit with a current generating ohmmeter.

13. A testing instrument of the character described, including a base, a standard thereon, a support extending upward from the base, a plate pivotally mounted upon the base for swinging movement in position over said support or out of such position, a cup carried by said swinging member, a plunger disposed above the support, the standard having a guide through which the plunger passes, the plunger having a head fitting within the cup, a spring bearing against the plunger, a screw mounted upon the standard and adapted to operatively engage said spring to force it downward to thereby exert compressive force upon the plunger and the substance within the cup, means for electrically connecting the substance in the cup with a combined generator and ohmmeter, means for indicating the pressure exerted upon said plunger by the spring, and resilient means for lifting the plunger when the pressure upon said spring has been relieved.

ARTHUR O. STORÉ.